United States Patent  [15] 3,656,507
Martinez  [45] Apr. 18, 1972

[54] LIQUID LEVEL CONTROL SYSTEM
[72] Inventor: Leonard S. Martinez, San Leandro, Calif.
[73] Assignee: The Singer Company, Friden Division, New York, N.Y.
[22] Filed: Aug. 6, 1970
[21] Appl. No.: 61,552

[52] U.S. Cl. ........................................................ 137/454
[51] Int. Cl. ..................................................... G05d 9/00
[58] Field of Search .............. 137/453, 454, 533.11, 533.13; 119/77

[56] References Cited

UNITED STATES PATENTS

| | | | |
|---|---|---|---|
| 2,389,820 | 11/1945 | Schwabe, Jr. | 137/454 |
| 1,435,858 | 11/1922 | Kennedy | 137/454 X |
| 1,530,657 | 3/1925 | Eummelen | 137/454 |
| 1,991,604 | 2/1935 | Drabin | 137/454 |
| 2,006,142 | 6/1935 | Jung et al. | 137/454 |
| 1,461,439 | 7/1923 | Burgin | 137/533.13 X |
| 2,254,584 | 9/1941 | Tornell | 119/77 |

Primary Examiner—M. Cary Nelson
Assistant Examiner—David R. Matthews
Attorney—Patrick J. Schlesinger, Charles R. Lepchinsky, Warren P. Kujawa and Jay M. Cantor

[57] ABSTRACT

A reservoir from which liquid may flow at a metered rate with the liquid normally maintained at a predetermined level. The liquid is supplied to the reservoir by a top-mounted container having a downwardly extending internally threaded neck into which a liquid level control valve assembly is threaded. The valve assembly cooperates with an upwardly extending protrusion mounted on the reservoir bottom to allow liquid to flow from the container to the reservoir. The liquid level in the reservoir may be adjusted by varying the vertical position of the control valve assembly.

3 Claims, 4 Drawing Figures

PATENTED APR 18 1972 3,656,507

INVENTOR.
LEONARDO S. MARTINEZ
BY
Warren P. Kujawa

— 1 —

LIQUID LEVEL CONTROL SYSTEM

BACKGROUND OF THE INVENTION

1. Field of the Invention

This invention relates to a device for selectively controlling the level of a liquid in a liquid supply reservoir.

2. Description of Prior Art

In prior liquid supply systems of the "chicken feeder" type, the liquid level is pre-established and is most difficult to alter. In such systems, any desired change of the liquid level can only be accomplished by raising or lowering the bottle, i.e., the source of liquid supply, relative to the supply reservoir. In known devices of this type, such an adjustment of the bottle is not possible, since the bottle rests in a fixed holder secured in position over the reservoir, or the bottle, in the form of a Mason jar, is threaded into the holder.

SUMMARY OF THE INVENTION

The invention disclosed herein comprises an improvement over the above-mentioned liquid supply systems which facilitates replenishment of the liquid supply bottle and which enables the level of liquid in the reservoir to be easily and rapidly adjusted with a minimum of effort.

In accordance with the present invention, the device for controlling the liquid level in a reservoir comprises a liquid supply container having a downwardly extending neck and which is adapted to be mounted above the reservoir basin. A liquid level control valve assembly is mounted in the neck of the container and is adjustable through a range of vertical positions. An upwardly extending protrusion mounted on the reservoir bottom is adapted to cooperate with the valve assembly to open the valve when the container is mounted over the reservoir basin, thereby allowing liquid to flow into the basin from the container. The level of the liquid in the reservoir basin is dependent on the vertical position of the valve assembly and may be easily adjusted by threading the assembly in either an advancing or retreating direction.

For a fuller understanding of the nature and advantages of the invention, reference should be had to the following detailed description, taken in conjunction with the accompanying drawings.

DESCRIPTION OF THE PREFERRED EMBODIMENT

Figure 1:
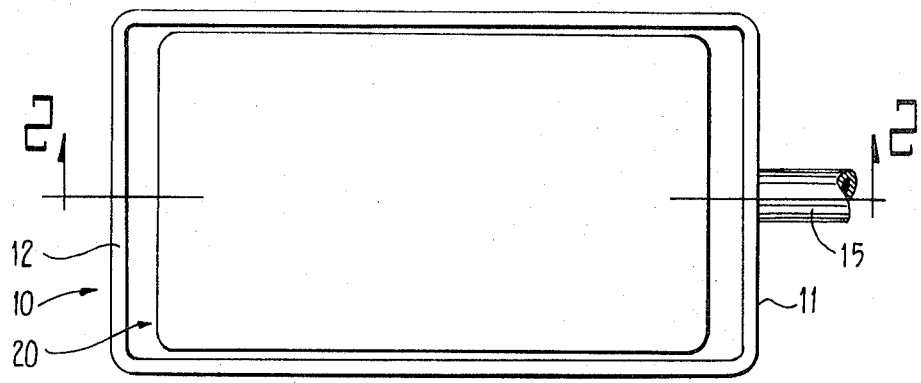
FIG. 1 is a plan view of the supply reservoir with the liquid supply container in operative position.
Figure 2:
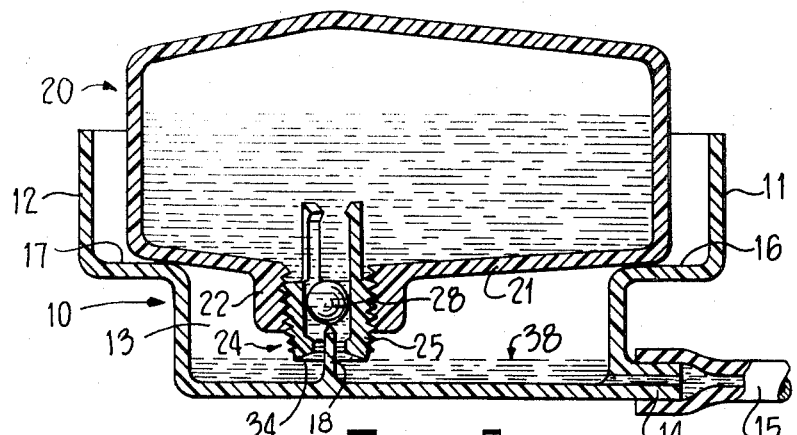
FIG. 2 is a transverse sectional elevational view of the liquid supply reservoir and the supply container in operative position, the view being taken on the plane indicated by line 2—2 in FIG. 1.

Referring to FIGS. 1 and 2, a liquid supply system is illustrated having a reservoir indicated at 10 which is generally rectangular in shape and which includes a pair of end walls 11, 12. The upper portions of end walls 11, 12 are offset to provide a reservoir basin 13. At one end, basin 13 of reservoir 10 is provided with a discharge outlet 14 and a hose connection 15. The location of outlet 14 is normally chosen to be no higher than the lowest liquid level desired to be maintained in reservoir basin 13. Extending upwardly from the bottom portion of basin 13 is a male member, or protrusion, 18 for a purpose described below.

End walls 11, 12 of reservoir 10 include ledges or shoulders 16, 17 which provide support for a closed liquid supply container 20. Container 20 has a substantially rectangular configuration generally conformable with the shape of the interior upper portion of reservoir 10, and is adapted to hold a supply of liquid as shown in FIG. 2 which is to be supplied to basin 13 of reservoir 10. Bottom wall 21 of container 20 has a downwardly extending neck 22 having a threaded central bore 23 for receiving a liquid level control valve assembly 24, described below. Both reservoir 10 and container 20 are preferably formed—e.g. by molding—of any suitable thermoplastic material known to those skilled in the art such as DELRIN or TEFLON.

Figure 4:
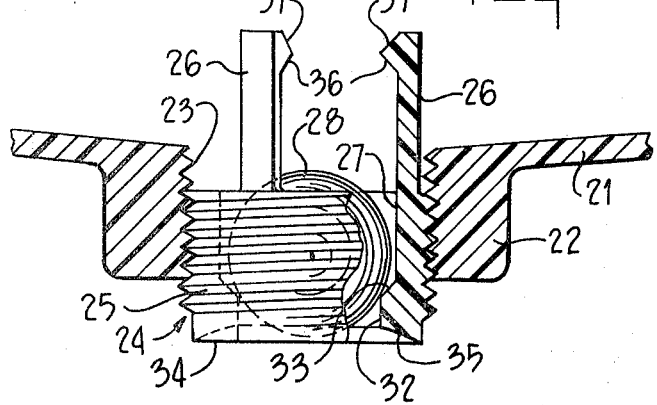
FIG. 4 is an enlarged view partially in section of the adjustable liquid level control valve assembly.
Figure 3:
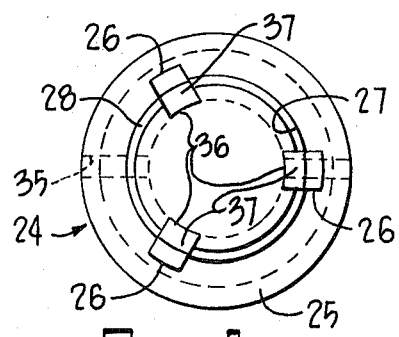
FIG. 3 is a plan view of the adjustable liquid level control valve assembly.

As illustrated most clearly in FIGS. 3 and 4, liquid level control valve assembly 24 comprises an externally threaded, substantially cylindrical body portion 25 having three longitudinally extending resilient fingers 26 spaced equiangularly about the periphery of body portion 25, and a major bore 27. The inner surface of each finger 26 is arcuately formed to coincide with the wall of major bore 27. The upper end of each finger 26 is provided with a radially inwardly extending, V-shaped nose 36 having an inwardly sloping top surface 37 for purposes to be described below.

In an assembled liquid level control valve assembly 24, a spherical ball 28 is confined within the space defined by the inner surface of each finger 26, major bore 27, and each nose 36. The diameter of ball 28 is chosen to be smaller than the inner diameter of major bore 27 in order to permit ball 28 to move freely within the above-noted space and also to allow fluid flow in the space between the ball surface and the surface of major bore 27.

The lower end of body portion 25 is provided with an axial bore 32 having a diameter smaller than that of major bore 27 and a chamfered shoulder 33 serving as a valve seat for ball 28. The lower end 34 of body portion 25 is provided with a diametral slot 35 for receiving a suitable adjusting tool—e.g., a screwdriver—for installing and adjusting the valve assembly 24. Body portion 25 of liquid level control valve assembly is preferably formed of any suitable thermoplastic material known to those skilled in the art, such as DELRIN or TEFLON, while ball 28 may be made from a suitably dense material—e.g. stainless steel—which can be smoothly finished.

To assemble the preferred embodiment, ball 28 is placed concentrically of resilient fingers 26 on sloping top surfaces 37 thereof and pressed downwardly. Downward pressure on ball 28 causes resilient fingers 26 to flex outwardly allowing ball 28 to pass constricting nose portions 36 and assume a position in the ball confining space defined above. After the ball has passed nose portions 36, fingers 26 reassume their illustrated position, thereby precluding escape of ball 28. The completed liquid level control valve assembly 24 is next threaded into neck 22 of closed container 20 a predetermined distance.

Container 20 is then inverted and filled with the desired supply liquid. During filling, ball 28 of liquid level control valve assembly 24 is retracted from its seating position on chamfered shoulder 33 which allows liquid to flow into the interior of container 20.

After container 20 is filled to the desired level with liquid, container 20 is righted to the normal position shown in FIG. 2. In this position, the weight of ball 28 is sufficient to seal the ball against chamfered shoulder 33, thereby closing minor bore 32 and preventing escape of liquid from the interior of container 20.

Container 20 is next placed in the operational position, also shown in FIG. 2. As container 20 is lowered over reservoir 10, male member 18 penetrates minor bore 32 and forces ball 28 away from chamfered shoulder 33. Release of the sealing action of the ball 28 and shoulder 33 results in the flow of liquid from supply container 20 through major bore 27 and minor bore 32 into reservoir basin 13. This downward flow of liquid continues until the level of the liquid in basin 13 rises above bottom end 34 of liquid level control valve assembly 24. When end 34 becomes submerged in the liquid, the interior of container 20 becomes sealed from atmospheric pressure and the above-noted downward flow ceases. This situation obtains until the egress of liquid through outlet 14 causes the level of liquid in reservoir basin 13 to fall below end 34 of valve assembly 24, whereupon liquid again flows from the interior of container 20 into basin 13. These alternate cycles of consumption and replenishment continue until all the liquid has been exhausted from the system. At this time, container 20 may be removed for refilling and the process repeated.

If at any time, container 20 must be removed before the liquid therein has been completely exhausted, this may be easily achieved with a minimum of spillage by virtue of the coaction of male member 18 and valve assembly 24. As container 20 is lifted from its operational position, ball 28 reseats against chamfered shoulder 33 under the combined influence of its own weight and the forces produced by the flow of liquid toward minor bore 32 from the interior of container 20. It has been found that removal of container 20 under such circumstances results in the spillage of a minimal amount of liquid, usually a few drops only. Due to the position of container 20 over reservoir basin 13, of course, this spillage is of no consequence.

The unique liquid level control valve assembly 24 disclosed herein provides an extremely simple means for adjusting the level of liquid in reservoir basin 13. This adjustment is rapidly effected by lifting container 20, turning valve assembly 24 in either an advancing (upward in FIG. 2) direction—to raise the level of liquid in basin 13—or a retreating (downward in FIG. 2) direction—to lower the level of the liquid in basin 13. If desired, a suitable graduated scale may be marked on an appropriate portion of valve assembly 24 denoting the magnitude of change of liquid level with rotation of the assembly 24, although this has not been found to be necessary in the preferred embodiment shown herein.

The invention disclosed above provides an improved liquid supply system which can be easily replenished and which enables the level of liquid in the reservoir basin of the system to be rapidly and easily adjusted to a desired working level. In addition, the invention may be easily and inexpensively constructed and possess a long, useful life. While the foregoing provides a full disclosure of the preferred embodiment of the invention, it is understood that various modifications, alternate constructions and equivalents may be employed without departing from the true spirit and scope of the invention. Therefore, the above description and illustrations should not be construed as limiting the scope of the invention, which is solely defined by the appended claims.

What is claimed is:

1. A liquid level control device comprising:
   a liquid reservoir having a discharge outlet;
   a source of liquid supply including a bottle having a threaded neck and positioned neck down above said reservoir for supplying a flow-in liquid to said reservoir,
   valve means for controlling the flow of liquid from said bottle and for maintaining said liquid at a predetermined level in said reservoir, said valve means comprising a cylindrical member threadedly engaged for adjustment in said neck of said bottle, said cylindrical member having an outlet end portion with a first inner diameter, an opposite end portion with a second inner diameter greater than said first inner diameter and a chamfered valve surface connecting said first and second diameters, a plurality of resilient fingers carried by said cylindrical member in angularly spaced relation and axially parallel thereto for providing a ball check confining cage, and means positioned at said outlet end portion of said cylindrical member for enabling the threaded adjustment thereof;
   said valve means further including a ball check positioned in said cage and normally engageable with said valve surface in any adjusted position of said valve means for closing said outlet end portion to prevent flow of liquid from said bottle; and
   means carried by said reservoir for displacing said ball check from said valve surface to permit the flow of liquid from said bottle into said reservoir upon positioning said bottle over said reservoir.

2. The apparatus of claim 1 wherein said displacing means comprises a spinal protrusion having a sufficient length to displace said ball check from said valve surface in any adjusted position of said valve means upon positioning said bottle over said reservoir.

3. The apparatus of claim 1 wherein said means for enabling said threaded adjustment of said cylindrical member comprises a diametral slot disposed in the outer end surface of said outlet end portion of said cylindrical member.

* * * * *